W. N. DENNISON.
SOUND BOX FOR TALKING MACHINES.
APPLICATION FILED FEB. 1, 1907.
1,084,319.
Patented Jan. 13, 1914.
2 SHEETS—SHEET 2.
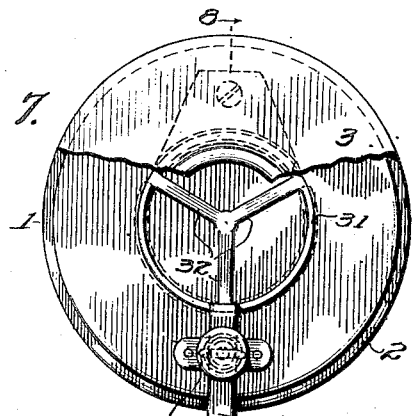
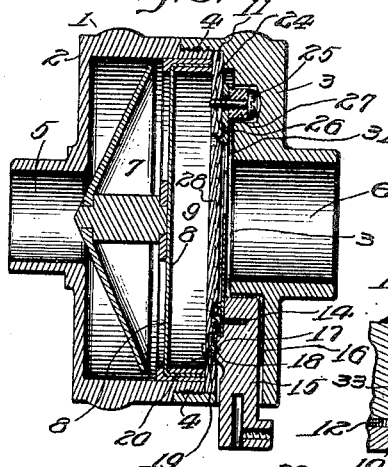
INVENTOR
Wilburn N. Dennison,
WITNESSES
BY
ATTORNEY

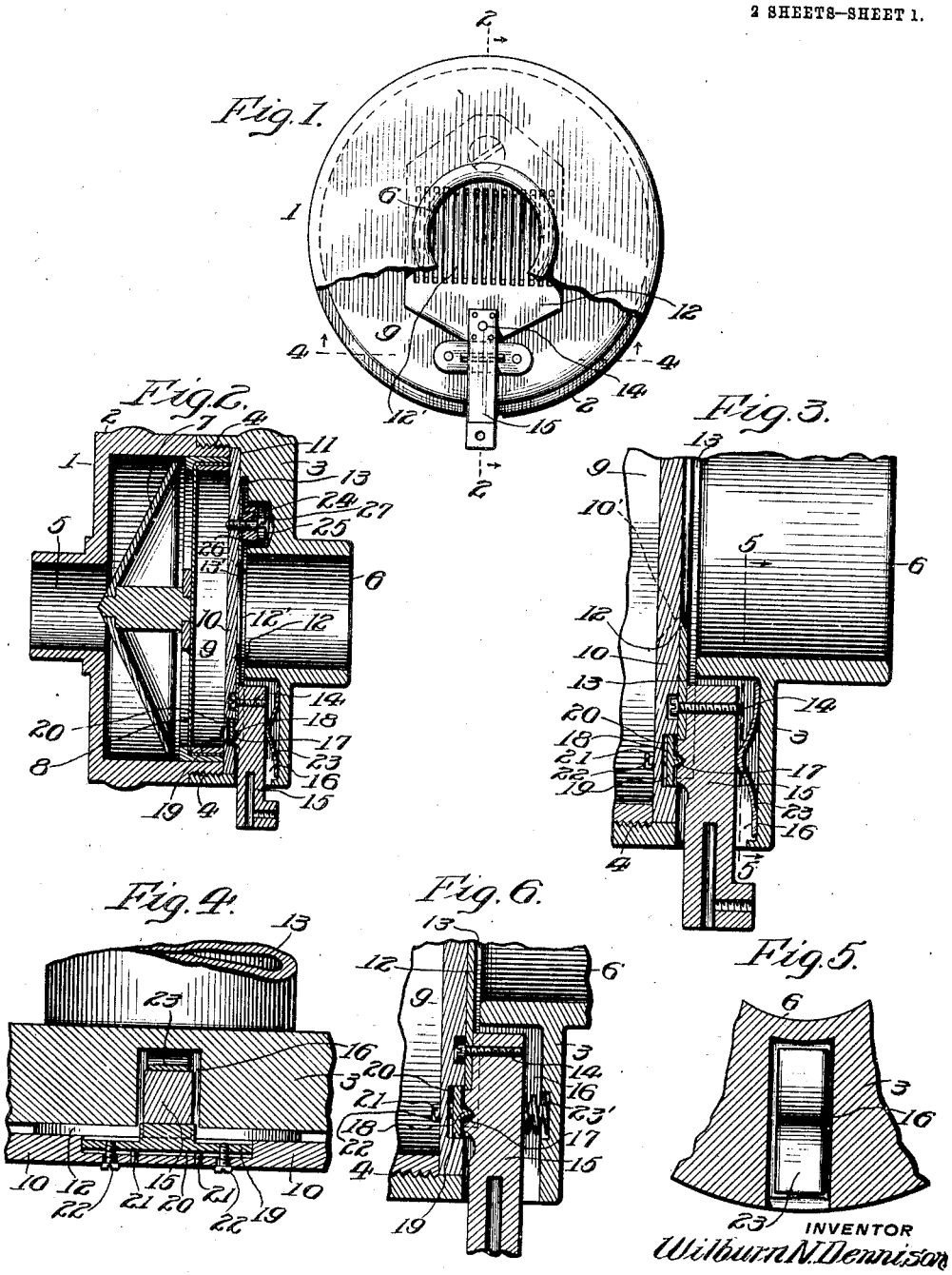

UNITED STATES PATENT OFFICE.

WILBURN N. DENNISON, OF MERCHANTVILLE, NEW JERSEY, ASSIGNOR TO VICTOR TALKING MACHINE COMPANY, A CORPORATION OF NEW JERSEY.

SOUND-BOX FOR TALKING-MACHINES.

1,084,319.  Specification of Letters Patent.  Patented Jan. 13, 1914.

Application filed February 1, 1907. Serial No. 355,217.

*To all whom it may concern:*

Be it known that I, WILBURN N. DENNISON, a citizen of the United States, and a resident of the borough of Merchantville, county of Camden, State of New Jersey, have invented certain new Improvements in Sound-Boxes for Talking-Machines, of which the following is a full, clear, and complete disclosure, reference being had to the accompanying drawings, forming part of this specification.

This invention relates in general to sound boxes, but more particularly to pneumatic sound boxes for talking machines and includes improvements in that form of pneumatic sound box in which a valve is provided, the movable member of which is positioned within and very close to the sound box casing so that the air passing through the valve is caught or trapped between the movable member and the casing to cushion or balance the movable member.

The main objects of this invention are: to provide in a pneumatic sound box a valve having a movable member of delicate construction which will respond readily to the vibrations of the stylus bar and which will be cushioned or balanced by the air passing through the valve; to provide an improved mounting for the stylus bar and the movable member of the valve, whereby the valve may be adjusted with great accuracy and whereby the balancing effect of the air after it has passed through the valve will not be impaired; to provide adjustable means for holding and tensioning the movable member upon its mounting; to provide an improved form of opening through the valve to permit the air to pass freely therethrough; and to provide other improvements as will appear hereinafter.

In the accompanying drawings, Figure 1 is a fragmentary front end view of a sound box constructed in accordance with this invention; Fig. 2 a longitudinal section on line 2—2 of Fig. 1; Fig. 3 an enlargement of a portion of Fig. 2; Fig. 4 an enlarged fragmentary sectional view on line 4—4 of Fig. 1; Fig. 5 a fragmentary sectional view on line 5—5 of Fig. 3; Fig. 6 a fragmentary sectional view corresponding to Fig. 3 showing a modification of the invention; Fig. 7 a view corresponding to Fig. 1 of a modified form of this invention; Fig. 8 a longitudinal sectional view taken on line 8—8 of Fig. 7, parts thereof being omitted; Fig. 9 an enlarged fragmentary longitudinal central sectional view of the sound box shown in Figs. 7 and 8; Fig. 10 a transverse sectional view of the sound box shown in Fig. 9; and Figs. 11 and 12 are enlarged fragmentary front and rear elevations respectively of the valve seat shown in Figs. 7 to 9.

Referring to the drawings, one form of this invention comprises a sound box 1 having a casing 2 and a cap or cover 3 secured to the casing in any suitable manner, as by screw threads 4. The casing is provided with an inlet 5 through which air is forced by any suitable mechanism and is also provided with an outlet 6 adapted to be connected to the usual sound conveying tube through which the air, having impressed upon it undulations corresponding to sound waves, passes to the usual sound amplifier.

Within the casing is mounted a deflector 7 and a reticulated diaphragm 8 by means of which the air entering the sound box is first deflected to the side walls of the sound box and is then diffused equally throughout the chamber 9 immediately back of the valve.

The valve is secured to the inside of the sound box in any suitable manner, for instance by having the edges of the stationary member or valve seat 10 clamped on the seat 11 between the casing 2 and the cap 3. The inner face of the cap 3 is recessed to form a shallow chamber 13 between the stationary valve member 10 and the inside wall of the cap, the movable valve member 12 being mounted within said shallow chamber 13.

In the form of the invention illustrated in Figs. 1 to 5 inclusive, the valve seat 10 is provided with a series of narrow parallel straight openings or ports 10' and the movable valve member is also provided with a similar series of openings 12', the two parts being so adjusted that the bars so formed between the openings in the said movable member overlap and close the said openings in the stationary member when the movable member rests squarely against the stationary member, as shown in Figs. 1 and 3.

The series of parallel openings in the valve members make a grid-like construction, which is wider than the opening 6 in the cap 3, to permit a considerable portion of the air passing the valve to be discharged directly into the shallow chamber 13 in the face of the cap 3. The air so discharged into the chamber 13 can pass out of the same only through the constricted opening 13' between the movable valve member 12 and the rear wall of said chamber and in so passing forms a cushion which balances the movable valve member 12 and renders the same very sensitive to the vibrations of the stylus bar. The slightest variation in the record groove will then be accurately imparted to the movable member of the valve greatly improving the quality of the reproduction.

The movable member 12 of the valve is secured to and carried by the stylus bar 15, the lower portion of the movable member being secured to the upper end of the bar in any suitable manner as by a screw 14. This stylus bar is reduced to the smallest dimensions consistent with rigidity and fits closely in a recess 16 provided therefor in the inner wall of the cap 3, the recess communicating with the cushioning chamber 13, and also opening outwardly through the side of the cover 3. The stylus bar projects outwardly from the casing and is provided at its outer end with the usual socket for holding the stylus.

The space between the stylus bar and the walls of the recess 16 is only sufficient to permit the necessary adjustment and free oscillation of the bar, so that the size of the cushioning chamber 13 is not materially increased by the free space in the recess 16, and so that any considerable amount of air is prevented from passing from the balancing chamber through the recess and out through the side of the sound box.

For mounting the stylus bar, the side of the bar adjacent the valve seat is provided with a transverse substantially V-shaped groove 17 in which is seated a knife edge 18 of a length substantially equal to the width of the bar. This knife edge is integral with a plate 19 of somewhat greater dimensions in length and width than the corresponding dimensions of the knife edge to provide a rigid base for the knife edge. The plate 19 rests against push screws 21, which are threaded through the valve seat 10 from the back thereof and the plate is held in position against these screws by the headed screws 22 which extend freely through the valve seat 10 from the back thereof and are threaded into the plate 19. By adjusting these screws 21 and 22, the knife edge may be adjusted to such a distance from the face of the valve seat 10 that the movable valve member 12 will rest normally squarely against the valve seat 10. The stylus bar is forced against the knife edge 18 by means of a spring 23 situated between the front side of the stylus bar and the adjacent wall of its recess, as shown in Figs. 3 and 4.

For yieldingly restraining the oscillation of the movable member of the valve, the member 12 is provided adjacent its upper or free end with an aperture 24, through which loosely extends the screw 25, which is threaded into the valve seat 10. The back wall of the shallow cushioning chamber 13 is recessed as at 26 to receive the head of the screw 25 and this recess is substantially filled by an elastic washer 27 mounted on the screw between the head of the screw and movable member of the valve, as shown in Fig. 2. The purpose of the screw 25 and washer 27 is to prevent the movable valve member 12 from being forced too far from its seat, should the pressure of the air within the sound box become greater than usual for any reason.

In Fig. 6 is shown a form of the invention in which a coiled or spiral spring 23' is substituted for the leaf or buckled spring 23, illustrated in the previously described construction. This spring is arranged so that it acts in the direction of the knife edge bearing 18 to hold the stylus bar firmly upon the same without exerting any substantial resistance to the free oscillation of the stylus bar.

From the above it will be apparent that the movable valve member is carried by a stylus bar which is mounted upon a knife edge bearing which occupies but a very little space and is so arranged as not to interfere with the effect of the pneumatic balance or cushioning chamber, and further, that this bearing may be easily adjusted so as to cause the movable member to rest normally squarely upon the stationary valve member without tension or tendency to bend or buckle.

In Figs. 7 to 12 inclusively is shown an embodiment of this invention in which the valve is annular instead of grid-like. In this form the stationary valve member 28 is provided on one side with a narrow circular groove 29, the depth of which is substantially half the thickness of the said stationary member, and on its opposite side the same is provided with a series of circular slots 30, which are a little wider than the width of the groove 29 and are cut through until they communicate with the groove 29. Between the slots 30, the material of the stationary valve member 28 forms a connection between the central portion of the stationary member of the valve and the outer portion thereof. The movable member of this modified form of valve, shown in Figs. 7 to 12 is in the form of a ring 31. The face of this ring is beveled and tapered toward the valve seat to form an annular rib substantially triangular in cross section, the apex of which is adapted to rest within the groove or annular valve port 29, to close the same when the movable member is in its normal position upon its seat. This ring 31 is provided with radial arms 32 to stiffen the same, thus making of the movable member a spider-like structure. The movable member is secured to the stylus bar by screws 14 or in any other suitable manner, as in the construction previously described. This annular movable valve member can be made extremely light, and somewhat flexible, and yet be sufficiently rigid to perform its function, and the construction of the valve is such that all of the air passing through the valve is admitted directly into the compression chamber to balance or cushion the movable member before passing outwardly through the opening 6 of the sound box to the amplifying horn, or other sound augmentative device.

Instead of employing a spring such as previously described for holding the stylus bar against its knife edge mounting, the stylus bar may be provided with a spring for this purpose, such as is shown in Figs. 9 and 10 which is adjustable from without the sound box casing to exert various pressures upon the stylus bar to meet various conditions. In this adjustable form of means for holding the stylus bar upon its mounting, the stylus bar 15 is provided with a chamber 15', and the cover 3 of the sound box casing with an opening 3' in axial alinement with the chamber of the stylus bar. At the bottom of the chamber 15' in the bar is a concentric opening 15'', and through the plate 19 is another opening 19', also in axial alinement with the chamber 15'. A screw 32 passes loosely from the outside of the sound box casing through the openings 3', 15', 15'' and 19', through the casing, the stylus bar, and adjustable supporting plate, and is threaded into the fixed valve seat 28, the outer end of the screw being provided with a knurled head 32' projecting outside of the casing. Surrounding the screw 32 between the head thereof and the bottom of the chamber 15' of the stylus bar is a spiral spring 33 and by turning the screw 32 from the outside of the casing, the pressure of the spiral spring 33 against the stylus bar may be varied to hold the bar with more or less force against the knife edges 18. The longitudinal axis of the screw 32 and the spiral spring 33 normally intersects the axis of oscillation of the movable member of the valve and is substantially perpendicular to the face of the valve seat.

In the operation of either of the forms of this invention above described, the movable member of the valve will be slightly lifted from its seat by the ordinary pressure of the air passing through the sound box and the movable member will be vibrated and slightly flexed by the stylus bar which is caused to vibrate in a well known manner by means of a suitable sound record, and sound waves corresponding to the undulations of the record will be impressed upon the air passing through the sound box. With a substantially uniform pressure of air in the sound box in the chamber back of the valve seat, the tensioning screw 25 and the elastic washer 27 might be dispensed with, but since the pressure of air back of the valve generally varies and may be greater than is absolutely necessary for the operation of the device, the screw and elastic washer are generally serviceable in preventing the movable member of the valve from being forced from its seat.

Although this invention has been described as embodied in a pneumatic sound box, it is obvious that some of the features of the invention might be used in other forms of sound boxes or in other devices, for instance the improved mounting for the stylus bar might be used in connection with any well known form of sound box having a diaphragm instead of a valve. Therefore when the term sound box is used it is intended to cover any form of sound reproducing means to which this invention might be applied. Moreover this improved mounting of the bar might be applied directly to the movable member of the valve and it is desired that the appended claims should be interpreted to cover either a mounting for a valve or a mounting for a stylus bar, or for any other movable member. Furthermore, although only two of the forms in which this invention may be embodied are described herein, the invention is not intended to be limited to either of these forms, as many changes might be made in the constructions set forth without departing from the spirit of this invention or the scope of the appended claims.

Having thus fully described the invention, I claim and desire to protect by Letters Patent of the United States:

1. In a sound box for talking machines, the combination with the casing of a valve consisting of a stationary and a movable member, said valve being located adjacent the wall of said casing, said casing being recessed to form a shallow balancing chamber in which said movable member is located, a stylus bar connected to said movable member and a knife edge bearing upon which said stylus bar is mounted.

2. In a sound box for talking machines, a stationary valve member, knife edge bearings adjustably mounted on said stationary member, a stylus bar, a movable valve member carried by said stylus bar, and yielding means arranged centrally of said bearings to hold said stylus bar on said knife edges.

3. In a sound box for talking machines, a stationary valve member, a movable valve member, knife edge bearings on said stationary member, a stylus bar attached to said movable member and means arranged centrally of said bearings for holding the said stylus bar on said knife edges.

4. In a sound box for talking machines, a recessed casing, a stylus bar substantially filling said recess, a stationary valve member, a movable valve member mounted on said stylus bar, knife edge bearings on which said stylus bar is mounted, and means extending through one side of said casing for holding said stylus bar on said knife edges.

5. In a sound box for talking machines, a stationary valve member provided with a recess, a plate having knife edges adjustably mounted in said recess, a stylus bar provided with a groove for engagement with said knife edges, and a spring acting toward the longitudinal axis of said bar for holding said stylus bar in engagement with said knife edges.

6. In a sound box for talking machines, a movable valve member consisting of a flexible ring having a beveled face, and a stationary valve member having a annular opening adapted to be opened and closed by said flexible ring.

7. In a sound box for talking machines, the combination with a movable valve member and a stylus bar attached thereto, of a casing the side of which adjacent said movable member is provided with a recess forming a chamber between said movable member and said casing, said chamber being provided with a depressed portion which the top of said stylus bar substantially fills.

8. A sound box for talking machines, comprising a casing having an opening adapted to be connected to the sound conveying tube of a talking machine, said casing being provided with a chamber around said opening, a valve mounted in said chamber whereby all of the air passing through said valve first enters said chamber before passing out of said opening.

9. In a sound box for talking machines, the combination with a stationary valve member having an annular opening therethrough, of a movable valve member having a projecting ring adapted to operate with said annular opening, and a stylus bar attached to said movable member.

10. In a sound box for talking machines, the combination of a stylus bar, a movable valve member mounted on said stylus bar, knife edge bearings on which said stylus bar is mounted, a casing inclosing said parts, and means accessible from without said casing for varying the pressure of the stylus bar upon said bearings.

11. In a sound box for talking machines, the combination of a stylus bar, a movable valve member mounted on said stylus bar, knife edge bearings on which said stylus bar is mounted, a casing inclosing said parts and adjustable means accessible from without said casing for yieldingly retaining said stylus bar in operative engagement with said knife edges.

12. In a sound box for talking machines, the combination of a casing, a stationary valve seat, a movable valve member, a stylus bar on which said movable member is mounted, knife edges carried by said valve seat within said casing, a groove on said stylus bar for engagement with said knife edges, a headed screw passing loosely through said stylus bar and threaded into said valve seat and extending outside of said casing, and a spring interposed between the head of said screw and said stylus bar to hold said stylus bar upon said knife edges.

13. In a sound box for talking machines, a fixed member, a knife edge bearing carried thereby and movable toward and away from said fixed member, a stylus bar mounted on said bearing, and yielding means to hold said bar on said bearing.

14. In a sound box for talking machines, a fixed valve member having a substantially flat surface provided with a recess, a knife edge bearing adjustably mounted in said recess, a substantially flat movable valve member, and a stylus bar attached thereto mounted on said knife edge bearing, the inner side of said bar being substantially in the plane of the inner side of said movable valve member.

15. In a sound box for talking machines, the combination with a valve seat provided with an annular port of a member having an annular portion with a beveled face arranged to engage in said port.

16. In a sound box for talking machines, the combination with a valve seat having an annular port, of a flexible member having an annular portion projecting from said member toward said port and adapted to open and close said port.

17. In a sound box for talking machines, the combination with a valve seat having an annular port of a flexible member having an annular portion adapted to open and close said port, said flexible member being mounted at one side of said port to oscillate toward and away from the same and being restrained upon the opposite side of said member.

18. In a sound box for talking machines, the combination with a valve seat having an annular port of a flexible member having an annular portion adapted to open and close said port, said flexible member being mounted at one side of said port to oscillate toward and away from the same and being yieldingly restrained upon the opposite side of said member.

19. In a sound box for talking machines, the combination with a stylus bar of a bearing for said bar and means rigid with said bearing and extending loosely through said bar intersecting the longitudinal axis thereof for holding said bar on its bearing.

20. In a sound box for talking machines, a stylus bar, a bearing for said bar, a projection secured to said bearing and extending loosely through said bar, intersecting the longitudinal axis thereof, and yielding means between said projection and said bar for holding said bar upon its bearing.

21. The combination with a valve seat provided with a recess in the face thereof, of a bearing adjustably mounted in said recess, and a movable member mounted to oscillate on said bearing.

22. The combination with a valve seat provided with a recess in the face thereof, of a bearing adjustably mounted in said recess, a movable valve member mounted to oscillate on said bearing, and means to hold said movable member upon said bearing.

23. The combination with a valve seat provided with a recess in the face thereof, of a bearing adjustably mounted in said recess, a movable member mounted to oscillate on said bearing, and yielding adjustable means to hold said movable member upon said bearing.

24. The combination with a valve seat having a recess in the face thereof, of a bearing adjustably mounted in said recess, a movable member mounted to oscillate on said bearing, and means connected to said seat and extending through said bearing and said movable member to hold said movable member on said bearing.

25. The combination with a valve seat provided with a recess, of a knife edge bearing adjustably mounted in said recess, a movable member mounted on said knife edge and yielding means for holding said movable member in engagement with said knife edge.

26. In a sound box for talking machines, a recessed casing, a stylus bar substantially filling said recess, a stationary valve member, a movable valve member mounted on said stylus bar, bearings on which said stylus bar is mounted, and means extending through one side of said casing for holding said stylus bar on said bearings.

27. The combination with a valve seat provided with a recess, of a bearing adjustably mounted in said recess, a stylus bar mounted to oscillate on said bearing, and means acting toward the longitudinal axis of said bar for holding said bar upon its bearing.

28. The combination with a valve seat, of a bearing carried thereby and movable toward and away from said seat, a movable member mounted to oscillate on said bearing, and means to hold said movable member on said bearing.

29. In a sound box for talking machines, the combination with a valve seat, of a bearing carried thereby and adjustable toward and away from said seat, a movable member mounted to oscillate on said bearing, and yielding means to hold said movable member on said bearing.

30. In a sound box, the combination with a valve seat having an annular port, of a movable annular valve member mounted to oscillate adjacent said seat upon an axis adjustable toward and away from said seat.

31. In a sound box the combination with a valve seat having an annular port, of a movable annular valve member mounted to oscillate adjacent said seat upon an adjustable axis.

32. In an elastic fluid sound reproducing apparatus, the combination of a valve seat provided with ports, a knife edge, a valve adapted to turn on said knife edge, a spring to hold said valve to its seat and an adjusting screw for controlling the pressure on said spring, substantially as set forth.

33. A sound box provided with an annular port, and a flat movable valve arranged adjacent said port to control the flow therethrough, and means to vibrate said valve in accordance with sound waves to impress sound waves upon a fluid passing through said port.

34. A sound box provided with a substantially annular port, and a movable substantially flat annular valve arranged adjacent said port to control the flow therethrough and means to vibrate said valve in accordance with sound waves.

35. In a sound box, the combination with a valve seat, of a bearing adjustable toward and away from said seat, a movable valve member mounted to oscillate on said bearing, and means to hold said valve member on said bearing.

36. In a sound box having a discharge opening, the combination with a flat valve seat in said sound box and provided with an annular port of greater diameter than that of said discharge opening, of a valve mounted on the discharge side of said valve and arranged to open and close said port, and means to actuate said valve in accordance with the sound waves.

37. In a sound box having a discharge opening, the combination with a valve mounted in said sound box and provided with an annular port of greater diameter than said discharge opening, of an annular valve mounted on the discharge side of said valve arranged to open and close said port, said valve being mounted in a chamber of larger diameter than the diameter of said discharge opening, and means to actuate said valve in accordance with sound waves.

38. In a sound box, the combination with a valve seat provided with an annular port, of a valve having a portion tapering in cross section toward said seat and arranged to engage in said port, and means to vibrate said valve in accordance with sound waves to impress sound waves upon a fluid passing through said port.

39. In a sound box, the combination with a valve seat provided with an annular port, of an annular valve having a portion tapering in cross section toward said seat, said portion being arranged to engage in said port, and means to vibrate said valve in accordance with sound waves to impress sound waves upon a fluid passing through said port.

40. In a sound box, the combination with a valve seat provided with an annular port, of a valve having an annular portion tapering in cross section toward said seat and arranged to engage in said port, and means to vibrate said valve by and in accordance with a sound record.

41. In a sound box, the combination with a flat valve seat provided with an annular port, of a valve having an annular portion tapering in cross section toward said seat and arranged to engage in said port, and means to vibrate said valve in accordance with sound waves to impress sound waves upon a fluid passing through said port.

In witness whereof I have hereunto set my hand this 30th day of January, 1907.

WILBURN N. DENNISON.

Witnesses:
 ALSTON B. MOULTON,
 ALEXANDER PARK.